March 4, 1924.
E. E. STERLING ET AL
1,485,733
WHEEL OR GEAR PULLER
Filed April 28, 1922    2 Sheets-Sheet 1
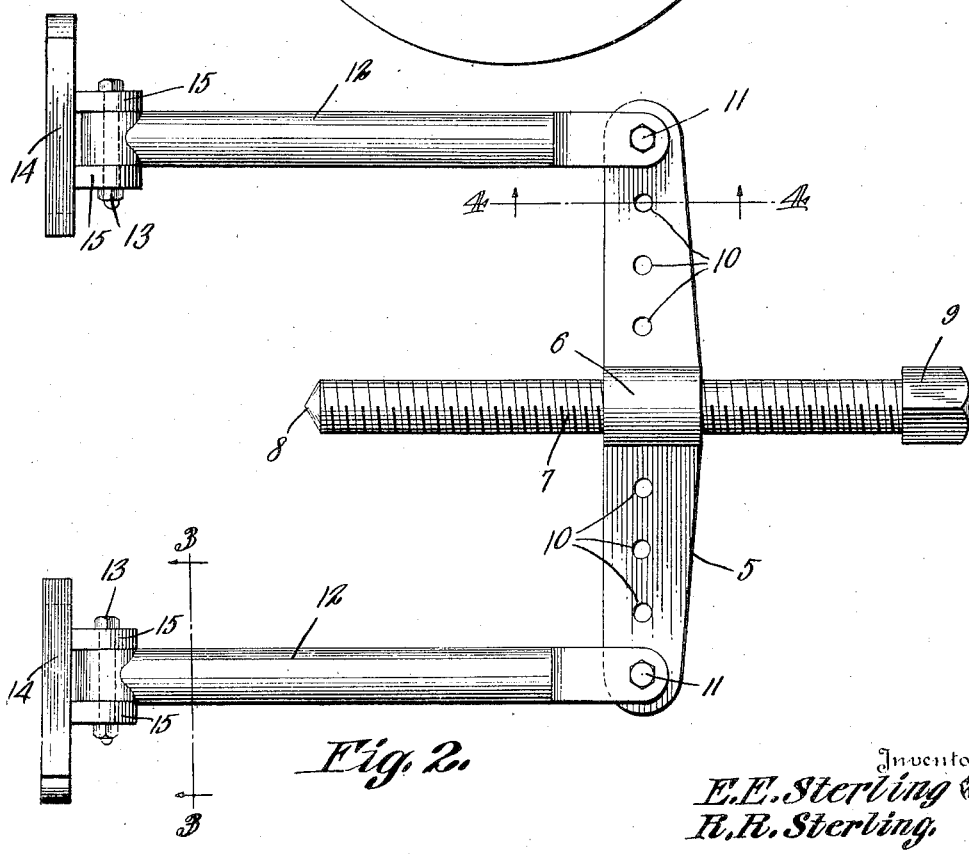
Inventors,
E. E. Sterling &
R. R. Sterling,
By Snow & Co.
Attorneys.

March 4, 1924.
E. E. STERLING ET AL
1,485,733
WHEEL OR GEAR PULLER
Filed April 28, 1922    2 Sheets-Sheet 2
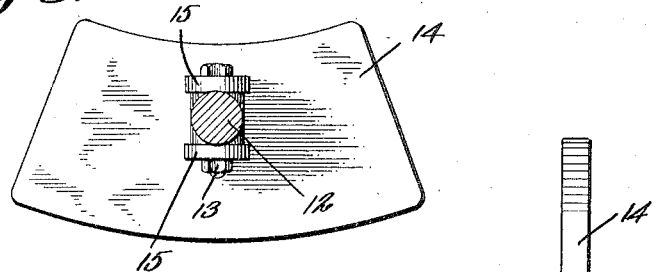
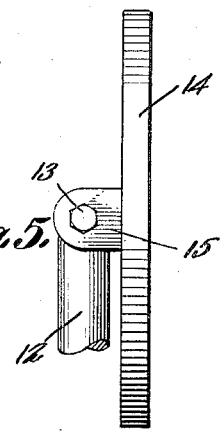
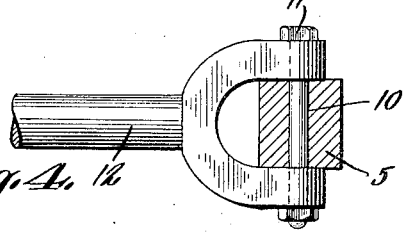
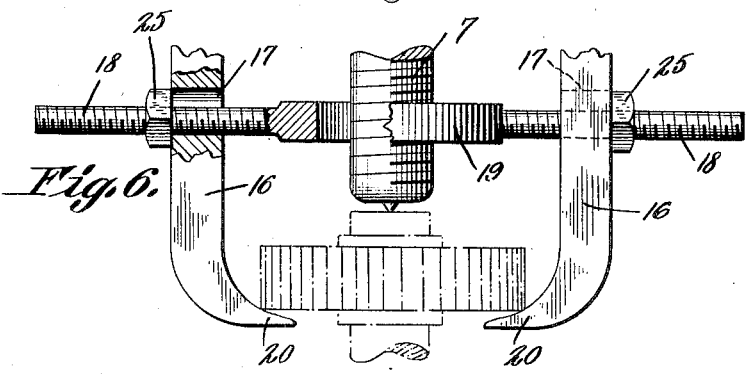
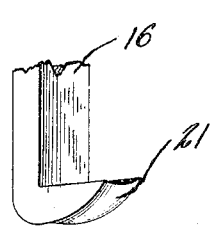
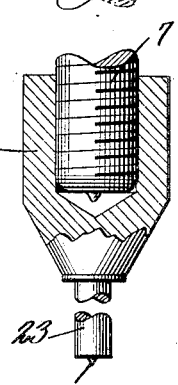

Patented Mar. 4, 1924.

1,485,733

UNITED STATES PATENT OFFICE.

ELLIS E. STERLING AND RICHARD R. STERLING, OF INDEPENDENCE, CALIFORNIA.

WHEEL OR GEAR PULLER.

Application filed April 28, 1922. Serial No. 557,104.

*To all whom it may concern:*

Be it known that we, ELLIS E. STERLING and RICHARD R. STERLING, citizens of the United States, residing at Independence, in the county of Inyo and State of California, have invented new and useful Wheel or Gear Pullers, of which the following is a specification.

This invention relates to wheel or gear pullers, the primary object of the invention being to provide a device of this character which may be readily and easily applied to a wheel and one wherein the connection between the device and the spokes of the wheel or gear will be such as to prevent slipping of the device with respect to the article under operation.

Another object of the invention is to provide means for adjusting the arms of the device with respect to the body portion thereof, to insure a direct pull on the article under operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view disclosing the device in use as a wheel puller.

Figure 2 is an elevational view of the wheel puller.

Figure 3 is a sectional view taken on line 3—3 of Figure 2.

Figure 4 is a sectional view taken on line 4—4 of Figure 2.

Figure 5 is a detail view showing one of the spoke engaging members in a folded position.

Figure 6 is a modified form of the invention disclosing the same as a gear puller.

Figure 7 is a fragmental elevational view of a modified form of jaw.

Figure 8 is a modified form of the invention showing a reducer employed in connection with the main screw.

Referring to the drawings in detail, the reference character 5 designates the body portion of the puller which is in the form of a bar formed with a central enlargement 6. An opening is formed in the enlargement 6, the walls of the opening being threaded to accommodate the threaded shank 7 or main screw.

This screw is formed with a tapered extremity 8 to contact with the axle or shaft on which the article to be pulled is positioned, so that lateral movement of the member 7 with respect to the article under operation, is restricted. On the outer end of the member 7 is formed a head 9 adapted to receive a wrench or the like, whereby the member 7 may be rotated.

Formed in the body portion 5 are the openings 10 which are disposed in suitable spaced relation with each other, the openings being adapted for the reception of the bolts 11 which connect the arms 12 to the body portion. The inner ends of the arms 12 are bifurcated to fit over the body portion 5 in a manner to permit of pivotal movement of the arms with respect to the body portion. Thus it will be seen that due to this connection, the arms 12 may be moved with respect to the body portion 5 to adapt the device for use in connection with wheels of various sizes.

The outer ends of the arms 12 are formed with openings to accommodate the bolts 13 that connect the spoke engaging members 14 to the arms 12. Each of the spoke engaging members 14 is formed with spaced ears 15 that are also apertured to receive the bolt 13 whereby pivotal connection between the arms 12 and spoke engaging members 14 will be made. Thus it will be seen that due to this construction, the spoke engaging members 14 may be moved to positions in parallel relation with the arms 12 as clearly shown by Figure 5 of the drawings, so that the spoke engaging members 14 may be moved to positions between adjacent spokes.

In the form of the invention as illustrated by Figure 6 of the drawings, the arms 16 are formed with openings 17 at points adjacent to the gear engaging ends thereof, which openings accommodate the threaded arms 18 formed integral with the circular member 19 that encircles the threaded shank 7 of the main screw. Thus it will be seen that due to this construction, the arms 16 are restricted from movement laterally, during the pulling operation.

As shown, the lower ends of the arms extend inwardly as at 20, where the same will engage under a gear to be pulled. A modified form of the jaw of the arm 16 is shown by Figure 7 of the drawings, wherein the jaw is formed with a relatively flat surface 21 conforming to the surface of a gear, the extreme edge thereof being concaved.

In order that the threaded shank 7 may be lengthened to adapt the device for use in connection with gears and shafts of various lengths, an extension member 22 is provided, which extension member includes a body portion adapted to be positioned over the extreme edge of the threaded shank 7 to secure the same thereto.

The member 22 is formed with a reduced portion 23 that is provided with a tapered extremity 24 adapted to bite into the shaft on which the gear to be pulled is positioned, to prevent movement of the shank with respect to the shaft. It is believed that in view of the foregoing description a further detail description of the operation of the device is unwarranted.

It might be further stated however that nuts 25 are provided on the threaded arms 18 which nuts may be moved into engagement with the arms 16 to hold the arms in their adjusted relations with respect to the arms 18.

Having thus described the invention, what is claimed as new is:—

1. A gear and wheel puller comprising a body portion, a pair of pivoted arms adjustably supported on the body portion, pivoted members supported at the free ends of the arms, and said pivoted members adapted to be moved to positions in parallel relation with the arms.

2. In a wheel puller, a cross head, an actuating member screw threaded into said cross head, pulling arms pivotally connected with said cross head on opposite sides of said actuating member, and wheel engaging members pivotally connected with the respective pulling arms near the free ends thereof and on fixed axes extending transversely to said arms.

3. In a wheel puller, a cross head, an actuating member screw threaded into said cross head, pulling arms pivotally connected with said cross head, and wheel engaging members pivotally connected with the respective pulling arms on transverse axes near the free ends thereof and each having parts extending on opposite sides of the pulling arm with which it is connected.

4. In a wheel puller, a cross head, an actuating member screw threaded into said cross head, pulling arms pivotally connected with said cross head, wheel engaging members arranged at the inner ends of the respective pulling arms, and removable pivot pins to connect said engaging members with said arms.

5. In a wheel puller, a cross head, an actuating member screw threaded into said cross head, pulling arms pivotally connected with said cross head, spoke engaging members extending transversely to said arms to engage the spokes of the wheel and having lugs to extend between said spokes, and means to pivotally connect said lugs with the respective pulling arms.

6. In a wheel puller, a cross head, an actuating member screw threaded into said cross head, pulling arms pivotally connected with said cross head, and spoke engaging members extending transversely to said arms to engage the spokes of the wheel and having lugs to extend between said spokes, and removable pivot pins to connect said spoke engaging members with the respective pulling arms.

7. In a wheel puller, a cross head, an actuating member screw threaded into said cross head, pulling arms pivotally connected with said cross head, and spoke engaging members pivotally connected with the respective pulling arms on axes extending transversely to said arms, said spoke engaging members extending transversely to said pulling arms and being curved to fit about the periphery of a brake drum.

8. In a wheel puller, a cross head, an actuating member screw threaded into said cross head, and flexible pulling members pivotally connected with said cross head on opposite sides of said actuating member and having spoke engaging members extending transversely thereto at their inner ends.

In testimony that we claim the foregoing as our own, we have hereto affixed our signatures in the presence of two witnesses.

ELLIS E. STERLING.
RICHARD R. STERLING.

Witnesses:
  S. D. HENDERSHOT,
  R. A. BELL.